Dec. 22, 1925.  
J. M. LILLY  
1,566,332  
AIR MOISTENER FOR INTERNAL COMBUSTION ENGINES  
Filed Nov. 1, 1921
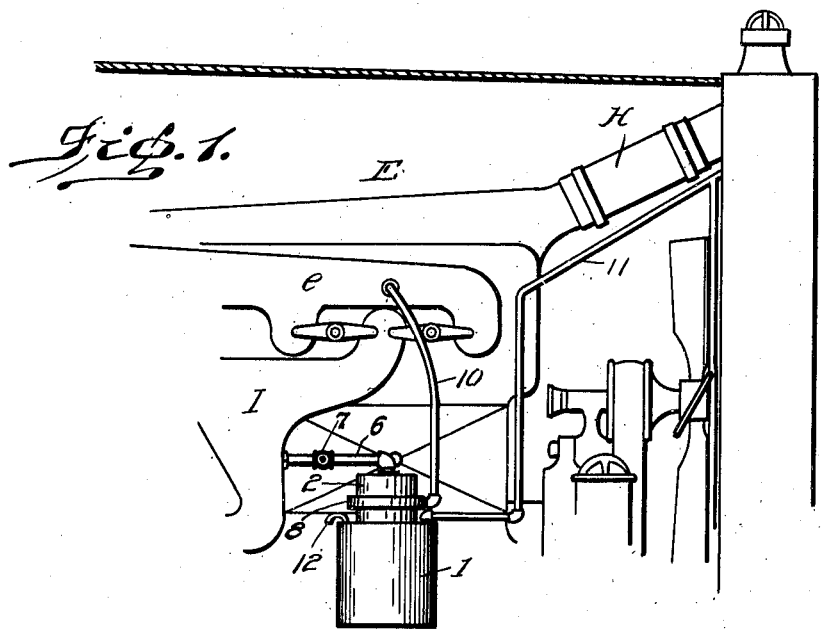
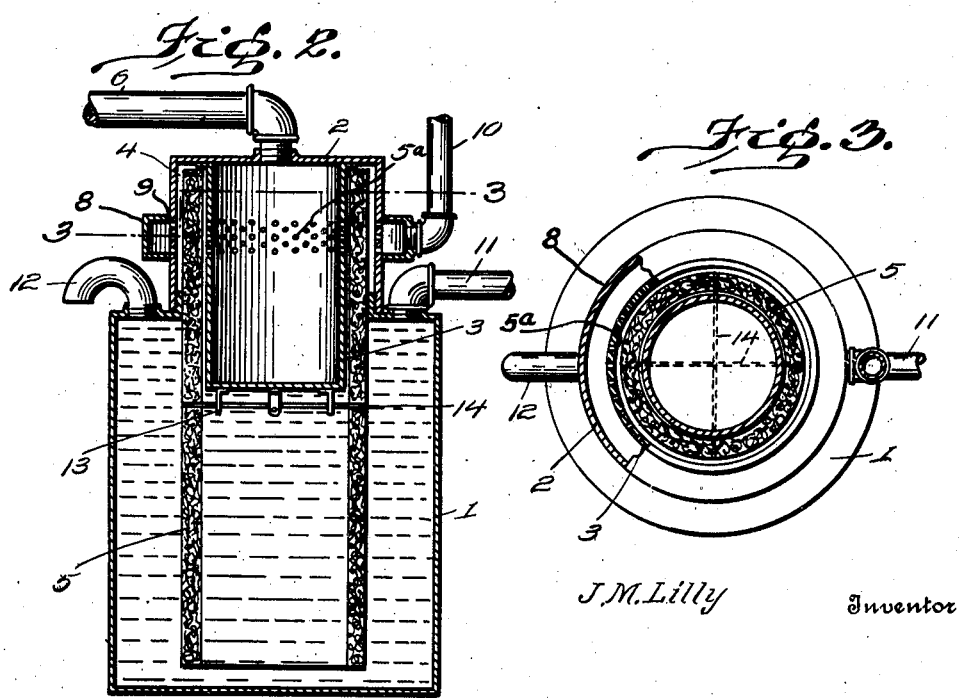

Patented Dec. 22, 1925.

1,566,332

UNITED STATES PATENT OFFICE.

JOE M. LILLY, OF NORWOOD, NORTH CAROLINA.

AIR MOISTENER FOR INTERNAL-COMBUSTION ENGINES.

Application filed November 1, 1921. Serial No. 511,973.

*To all whom it may concern:*

Be it known that I, JOE M. LILLY, a citizen of the United States, residing at Norwood, in the county of Stanly and State of North Carolina, have invented certain new and useful Improvements in Air Moisteners for Internal-Combustion Engines, of which the following is a specification.

This invention relates to means for moistening and heating the air supply for internal combustion engines.

The object of the invention is to provide a simple and efficient device of this character which may be readily attached to engines already in use by making no change except to drill openings in the manifolds for connection of the device and providing a connection with the radiator overflow pipe.

Another object is to provide a device of this character which supplies heated moist air to the intake manifold thereby economizing in the use of gasoline and at the same time increasing the speed.

With these and other objects in view, the invention consists in certain novel features of construction as hereinafter shown, described and claimed.

In the accompanying drawings:—

Figure 1 represents a side elevation of the front portion of an automobile engine with the improved moistener shown applied, the engine hood being in section.

Fig. 2 is a central vertical section of the attachment detached, and,

Fig. 3 is a horizontal section taken on the line 3—3 of Fig. 2.

In the embodiment illustrated, a Ford car engine shown at E is equipped with the usual intake manifold I, exhaust e, and radiator supply hose H.

The attachment constituting this invention comprises a water container in the form of a tank 1 composed of a suitable non-corrodible metal provided in its top with an opening. Seated on the top of the tank 1 is a hollow cylindrical casing 2, which is open at its bottom and surrounds the opening in the top of the tank 1. The casing 2 is closed at its top and further has secured to the inner face of its top a hollow cylindrical receptacle 3 closed at its upper end by the top of the casing 2 and further having a closed bottom. The receptacle 3 depends through an opening in the top of the tank 1 and into the latter a substantial distance.

The receptacle 3 is of less diameter than the diameter of the casing 2, thereby providing a space 4 into which extends the upper portion of a hollow circular wick 5, and the latter is of a length to extend a substantial distance into the body of water within the tank 1.

The receptacle 3, intermediate its ends, has the body thereof formed with a perforated portion, as indicated at $5^a$, for a purpose to be presently referred to. The receptacle 3 provides an exhaust gas collecting chamber and communicating therewith as well as leading therefrom, is an exhaust gas conducting pipe 6 provided with a controlling valve 7. The pipe 6 is connected to the top of the casing 2 and opens into the receptacle 3 and is furthermore connected to and opens into the intake manifold I of the engine.

The casing 2, intermediate the ends thereof, has its body formed with a perforated portion 9, which is surrounded by an annular channel-shaped member 8 forming an exhaust gas distributing chamber and communicating with said chamber and leading from the exhaust manifold E of the engine is a pipe 10 for conducting exhaust gases to said chamber, and said gases are sucked through the wick 5 and into the receptacle 3 and from there conducted by the pipe 6 to the intake manifold I.

A water supply pipe 11 leads from the upper end of the radiator to the tank 1.

Depending from the bottom of the receptacle 3 is a plurality of apertured lugs 15 which support wires 14, and these latter engage the wick 5 for suspending it. The tank 1 has an overflow pipe 12.

The casing 2 is detachably mounted on the tank 1, whereby access can be had to the interior of the tank for cleaning and other purposes. The supply pipe 11 and overflow pipe 12 are also preferably made detachable as shown.

It will also be obvious that the extension of the wick 5 into the tank 1 supplies the upper portion of the wick with ample moisture to be drawn by the suction in the cylinders into chamber 3 and out through pipe 6 to the intake manifold.

The preferred embodiment of the invention is disclosed in the drawings and set forth in the specification, but it will be understood that any modifications within the scope of the claimed invention may be made in the construction without departing from the principle of the invention or sacrificing any of its advantages.

I claim:—

1. A device for the purpose set forth comprising a water tank having its top provided with an opening and an upstanding continuous flange forming a continuation of the wall of the opening, an open bottom casing formed with an outlet at its upper end, said casing mounted on said top, surrounding said flange and having a part of its body portion perforated, a closed bottom receptacle suspended from and having its upper end closed by the top of said casing and extending through said opening into the upper portion of said tank, said receptacle having a part of its body portion perforated, a channel-shaped member surrounding and enclosing the perforated part of the casing and providing a distributing chamber for exhaust gases conducted thereto, and a tubular wick interposed between said receptacle and casing and depending through said opening below the bottom of the receptacle.

2. A device for the purpose set forth comprising a water tank having its top provided with an opening and an upstanding continuous flange forming a continuation of the wall of the opening, an open bottom casing formed with an outlet at its upper end, said casing mounted on said top, surrounding said flange and having a part of its body portion perforated, a closed bottom receptacle suspended from and having its upper end closed by the top of said casing and extending through said opening into the upper portion of said tank, said receptacle having a part of its body portion perforated, a channel-shaped member surrounding and enclosing the perforated part of the casing and providing a distributing chamber for exhaust gases conducted thereto, a tubular wick interposed between said receptacle and casing and depending through said opening below the bottom of the receptacle, and means carried by and projecting from the bottom of the receptacle for suspending the wick.

In testimony whereof, I affix my signature hereto.

JOE M. LILLY.